(No Model.)

E. W. CARLETON.
CLUTCH.

No. 559,261.

2 Sheets—Sheet 1.

Patented Apr. 28, 1896.

WITNESSES
Fred G. Dieterich
Jos. A. Ryan

INVENTOR
Ernest W. Carleton
BY
ATTORNEYS.

(No Model.) 2 Sheets—Sheet 2.
E. W. CARLETON.
CLUTCH.

No. 559,261. Patented Apr. 28, 1896.

WITNESSES:
Fred G. Dieterich
Jos. A. Ryan

INVENTOR
Ernest W. Carleton
BY
Munn & Co.
ATTORNEYS.

UNITED STATES PATENT OFFICE.

ERNEST WILLIAM CARLETON, OF AUSTIN, TEXAS.

CLUTCH.

SPECIFICATION forming part of Letters Patent No. 559,261, dated April 28, 1896.

Application filed July 2, 1894. Serial No. 516,368. (No model.)

*To all whom it may concern:*

Be it known that I, ERNEST WILLIAM CARLETON, residing at Austin, in the county of Travis and State of Texas, have invented certain new and useful Improvements in Clutches, of which the following is a specification.

My invention relates to improvements in clutches, and it refers more particularly to clutch devices used for transmitting power; and such invention primarily has for its object to provide a clutch mechanism of this character of a simple and economical construction, and which will positively serve for its intended purpose.

A still further object is to provide a clutch having independent rotatable disks that act on peripheral eccentric portions, which are so arranged that the said disk will be held free from contact with the drive-shaft and the entire bearing of the clutch mechanism thrown on the grip members, whereby the shaft-apertures in the disks can be made sufficiently large to overcome any irregularity of the bearing-faces of the internal cam portions and obviating the necessity of providing outside collars.

With other minor objects in view, which hereinafter will appear, the invention consists in such novel features of construction and peculiar combination of parts as will be first described in detail and then specifically pointed out in the appended claim, reference being had to the accompanying drawings, in which—

Figure 1:
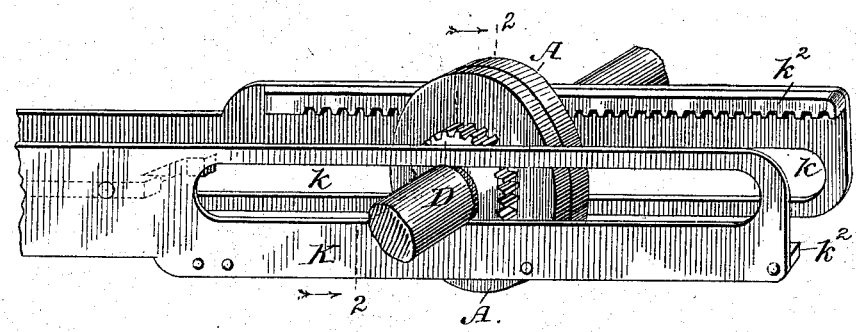
Figure 2:
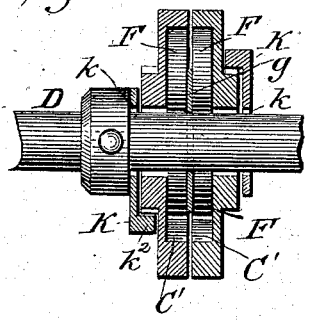
Figure 4:
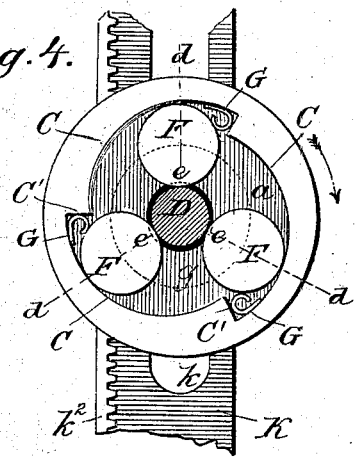
Figure 3:
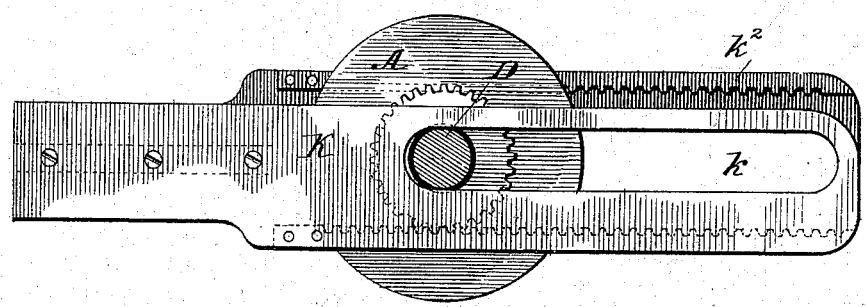
Figure 5:
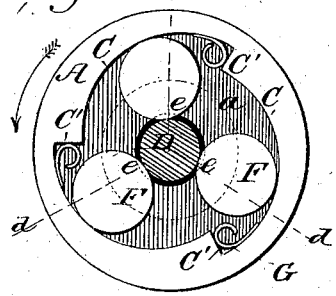
Figure 6:
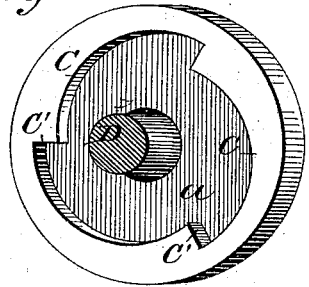
Figure 7:
Figure 8:
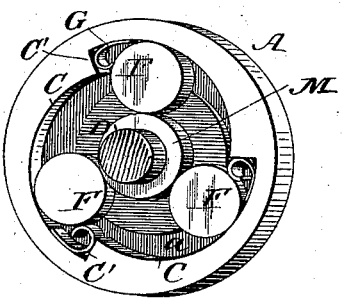

Figure 1 is a perspective view of a double-clutch device constructed in accordance with my invention and arranged for transmitting a reciprocating motion from a continuously-rotating drive-shaft. Fig. 2 is a transverse section thereof, taken on the line 2 2, Fig. 1. Fig. 3 is a side view thereof. Fig. 4 is a face view of one section of the clutch, showing the grip members in their normal or non-gripping position. Fig. 5 is a similar view showing such disks to their gripping position. Fig. 6 is a perspective view of one of the disks with the grip members removed. Fig. 7 is a view of one of the grip members or disks, and Fig. 8 is a perspective view of a modification of the clutch adapted for use in connection with heavy machinery.

In the preferred form my improved clutch devices are in the nature of a compound or double clutch, as shown in Fig. 1, and in such case the same comprises a pair of disks A A, each of which have cam and grip devices constructed alike, but arranged to operate alternately, whereby a rotary motion from a reciprocating motion is attained.

As the detailed construction of each set of clutch devices is alike, a description of one set will suffice for both.

The disk A is formed with a recess $a$, the edge of which is formed into a series (preferably three) of eccentrically-arranged pockets having inclined bearing-faces C, which are joined by radially-disposed shoulders C', which form, as it were, the seats of such pocket portions. The bearing-faces of the pockets are struck from a center off of the axial center of the disk A on lines indicated by the dotted lines $d\,e$, as indicated in Figs. 4 and 5.

The drive-shaft D, in practice, is journaled in suitable bearings, (not shown,) and such shaft passes centrally through the clutch-disks, but is held from contact therefrom. For this purpose the clutch-disks have their central aperture made of such a diameter that no matter how irregular the clutch members may wear the disks A will not at any time run in contact with the said shaft D, for a purpose presently explained.

F indicates the grip members, which are in the nature of small disks or rings, the diameter of which equals the space between the shaft D and the eccentric bearing-faces of the pockets on the line $d\,e$, and such grip members are normally held up to this position when not set for a gripping action by their frictional contact with the shaft and said eccentric faces, and in some instances by the cushion-springs G, which may be like those shown or hard rubber or other spring material, as desired.

By forming the pockets as shown and making the axial openings in the disks A A larger than the shaft, the grip members of a diameter equal the space between the shaft, and the eccentric base of the pocket on the lines $d\,e$ it will be manifestly understood that at all times the shaft will have a bearing on the said members F.

It will be thus seen that the several grips

F will maintain an accurate position at all times, so that when the disk A is turned in the direction indicated by the arrow (see Fig. 5) the several grips will in unison engage the shaft, and thereby avoid the twisting strain incident to the use of clutch members which must be held up by spiral or other spring pressure, as in the use of such clutch devices the tension of the several springs soon becomes unequal and thereby causes the several grips to irregularly grip the shaft and give it a twist strain. Furthermore, as the grips F when in the position shown in Fig. 4 are practically loosely held between the shaft and the base of the pockets it is manifest that when the disk A turns in the direction indicated by the arrow in such Fig. 4 and the shaft turns in the opposite direction the said disks F will also rotate and thereby reduce the frictional bearing of the shaft on such disks to a minimum.

When a double set of clutch devices are used, metallic washers $g$ are placed between them to hold the grip members in place.

K indicates a frame slotted at $k\,k$ to fit over the drive-shaft, which frame is in practice adapted to be reciprocated in any desired manner, and such frame has oppositely-disposed rack portions $k^2\,k^2$, which are held in engagement with toothed wheels secured to or formed integral with the disks A A, as shown, it being manifest, however, that in practice the reciprocating devices can be varied as may be desired.

While I prefer to use the clutch mechanism as a double clutch it is manifest but a single set need be employed, the intermittent operation of which will serve to impart a rotary motion to the shaft, it being obvious that such devices may also be used in the nature of a grip for engaging and lifting a non-rotatable shaft.

In Fig. 8 I have shown a somewhat modified form of the device which is especially adapted for use for heavy machinery. In this construction a sleeve or hub portion M is fixedly connected to the shaft with which the grip members engage, such portion taking up the wear produced by the clutching action of the grips.

Having thus described my invention, what I claim, and desire to secure by Letters Patent, is—

As the improvement hereinbefore specified, the combination, with the drive-shaft, and a clutch-disk having an axial opening which considerably exceeds the diameter of said shaft, and provided with a recess, $a$, whose periphery is a series of eccentric portions, C, connected by radial shoulders, and a like series of circular disks which are distributed in the eccentric pockets and wholly independent of each other, and whose diameter considerably exceeds the distance between the radial opening and the farthest radial point of any of said eccentric portions, as shown and described.

ERNEST WILLIAM CARLETON.

Witnesses:
JAMES LOUIS O'CONNOR,
THOMAS LYCURGUS WREN.